United States Patent [19]

Nishida

[11] Patent Number: 5,018,040
[45] Date of Patent: May 21, 1991

[54] TAPE TIME DISPLAY DEVICE FOR DISPLAYING A TAPE REMAINDER TIME

[75] Inventor: Yoshihiro Nishida, Nagaokakyo, Japan

[73] Assignee: Mitsubishi Denki Kabushiki Kaisha, Tokyo, Japan

[21] Appl. No.: 275,535

[22] PCT Filed: Mar. 16, 1988

[86] PCT No.: PCT/JP88/00274

§ 371 Date: Nov. 16, 1988

§ 102(e) Date: Nov. 16, 1988

[30] Foreign Application Priority Data

Mar. 20, 1987 [JP] Japan .................. 62-66243

[51] Int. Cl.[5] ............................................. G11B 15/18
[52] U.S. Cl. ..................................... 360/137; 242/191
[58] Field of Search ............... 360/137, 71, 72.1, 72.3, 360/74.2, 73.04; 242/186, 191

[56] References Cited

U.S. PATENT DOCUMENTS

| 4,172,231 | 10/1979 | d'Alayer de Costemore d'Arc et al. ............................. 360/137 X |
| 4,280,159 | 7/1981 | Nakayama ........................... 360/137 |
| 4,411,008 | 10/1983 | d'Alayer de Costemore d'Arc et al. ............................. 360/72.3 X |
| 4,479,159 | 10/1984 | Kamei et al. ....................... 360/137 |
| 4,644,436 | 2/1987 | Unno .................................. 360/137 |
| 4,727,446 | 2/1988 | Kaaden ............................... 360/137 |

FOREIGN PATENT DOCUMENTS

| 2746613 | 5/1978 | Fed. Rep. of Germany ...... 360/137 |
| 55-58861 | 1/1980 | Japan . |
| 0064673 | 5/1980 | Japan .................................. 360/137 |
| 56-98763 | 8/1981 | Japan . |
| 56-165970 | 12/1981 | Japan . |
| 56-174189 | 12/1981 | Japan . |
| 59-42681 | 3/1984 | Japan . |
| 59-68884 | 4/1984 | Japan . |

Primary Examiner—Robert S. Tupper
Assistant Examiner—Andrew L. Sniezek

[57] ABSTRACT

A tape time display apparatus according to the invention includes a device for outputting a predetermined number of pulse signals for one rotation of a reel on which tape is wound, a detector for detecting the period of rotation of the reel from the pulse signals when the tape travels at a constant speed, a unit for calculating the reel pulse number from the reel rotation periods, the tape travel speed and the tape thickness corresponding to the length of the tape on the reel, a device for increasing or decreasing according to the direction of the reel rotation the number of the pulses output accompanying the travel of the tape, device for calculating the tape time, which is obtained by converting the constant-speed travel into a time, of the reel pulse number P when the tape time display signal is input, and a display for displaying the tape time thus calculated.

6 Claims, 2 Drawing Sheets

TAPE TIME DISPLAY DEVICE FOR DISPLAYING A TAPE REMAINDER TIME

BACKGROUND OF THE INVENTION

This invention relates to a tape time display device for displaying the remainder time of the tape that remains on a supply reel or the travel time of the tape that has been wound on a take-up reel (hereinafter referred to as "tape time") in a tape recorder or the like.

BACKGROUND ART

Examples of conventional tape time display devices are disclosed by Japanese Laid-open Patent Application No. 98763/1981 and Japanese Laid-open Patent Application No. 165970/1981.

In these conventional devices, it is assumed that tape remainder time T on a supply reel is given by:

$$T = \frac{v}{4\pi d} \cdot fs^2 - \frac{\pi \cdot r^2}{d \cdot v}$$

where r is the diameter of the hub of the reel, d is the thickness of the tape, fs is the rotation period of the supply reel, and v is the tape speed. Display of the tape remainder time or the tape travel time is made only during the recording and reproduction processes when the tape speed v is constant.

There is a conventional device which calculates and displays the tape time during the fast feed and the rewind travel processes similar to the constant-speed travel, as disclosed in Japanese Laid-open Patent Application No. 165970/1981. However, this conventional device calculates and displays the tape time on the basis of the rotation speed or the rotation period of the reel and the tape remainder time immediately before switching to the fast feed or rewind, processed by detection of the rotational speed of the reel.

Because the conventional tape time display devices are configured as described above, if they are designed to perform display of the tape time for both the constant-speed travel process; and the fast speed and process, the construction of the device becomes complicated which produces an expensive device, because the equations used for the tape remainder time calculations are different.

The invention has been made to solve the above-described problems. An objective of the present invention is to provide an inexpensice tape time display device which can calculate and display the tape time on the basis of a simple equation in any travel condition once the constant-speed travel is made.

SUMMARY OF THE PRESENT INVENTION

The tape time display device according to an embodiment of the present invention comprises means for generating pulse signals of a fixed number each time a reel completes a rotation, means for detecting the rotation period of said reel from said pulse signals during the constant-speed travel, means for calculating the reel pulse number corresponding to the length of the tape wound on the reel on the basis of said rotation period, the radius of the hub of said reel, the travel speed of the tape and the thickness of the tape, means for increasing and counting up or decreasing the number of pulses output accompanying the subsequent rotation of the reel depending on the direction of the rotation of the reel, means for calculating the tape time, when the tape time indication command is input by converting the tape pulse number into the constant-speed travel time, and means for displaying the tape time that has been calculated.

The tape time display device according to an embodiment of the present invention calculates the period of the rotation of a reel from the intervals of the pulse signals during the constant-speed travel and the number of turns of the tape wound on the reel from the radius of the hub of the reel, the tape speed, and the thickness of the tape. The device calculates the reel pulse number P corresponding to the tape length on the basis of the number of turns of the tape. The reel pulse number increases or decreases the number of pulses that are output in accordance with the subsequent rotation of the reel, depending on the direction of rotation of the reel, and the representation of the length of the tape wound on the reel is maintained. When the tape time display signal is input, the existing reel pulse number is converted into the travel time for a constant-speed travel, which is subsequently displayed on the display device.

According to the present invention, the rotation of the reel is detected, and pulse signals are output at a rate of a fixed number per rotation. The rotation period of the reel is calculated from the pulse signals, the reel pulse number at that time is calculated from the rotation period, the number of pulses that are output for the subsequent rotation of the reel are increased or decreased depending on the direction of the rotation, and the reel pulse number is converted into the tape time for being displayed. Accordingly, the structure is simple so that an inexpensive device may be provided, and the tape time can be displayed when the apparatus is not in a constant-speed travel once the constant-speed travel has been experienced. Thereby, a tape time display device which is easy to manipulate is thereby obtained.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION FOR THE PREFERRED EMBODIMENTS OF THE PRESENT INVENTION

An embodiment of the present invention will now be described for a situation in which the rotation of the supply reel is detected and the tape remainder time is calculated and displayed.

Figure 1:
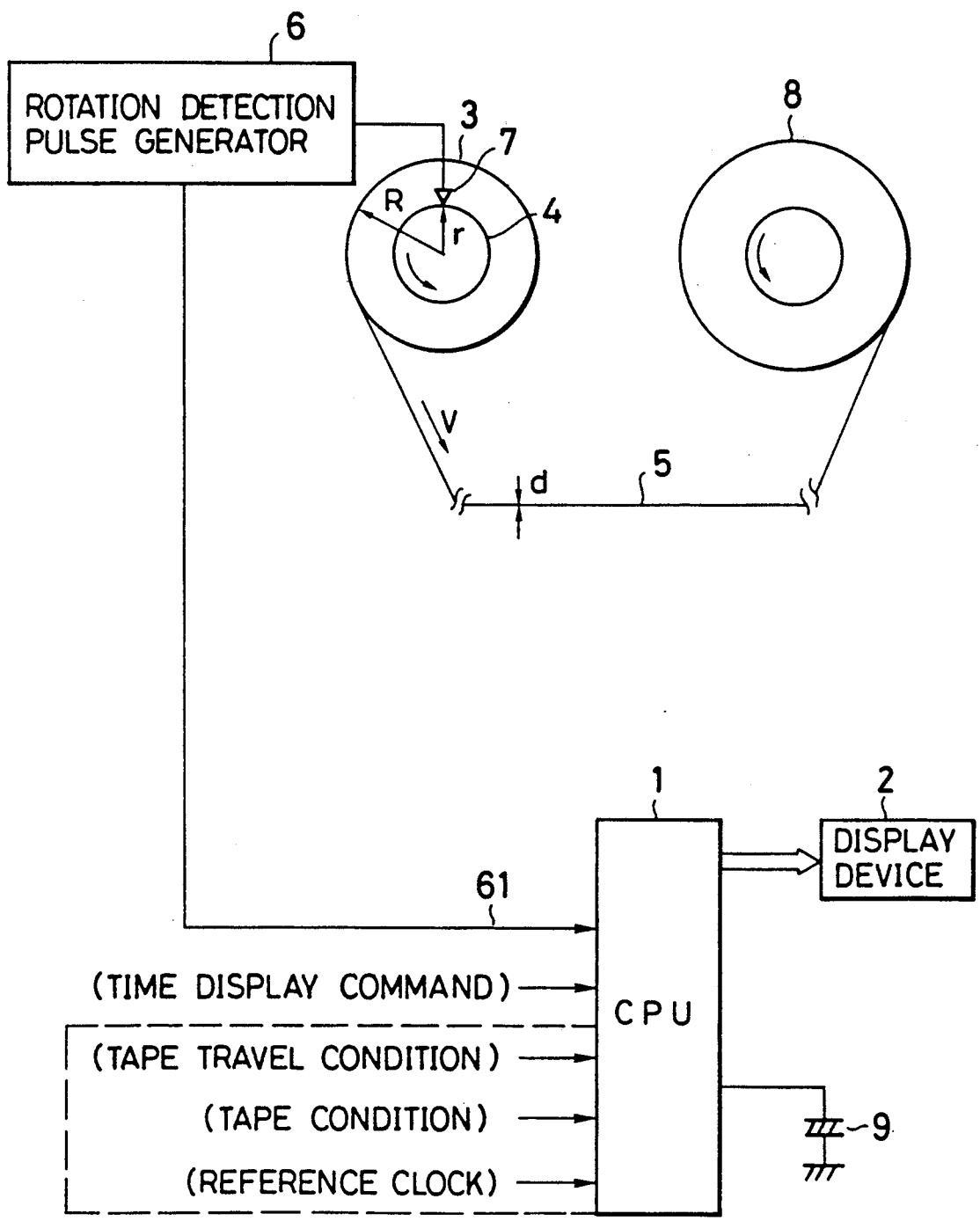
FIG. 1 is a block diagram illustrating a configuration of an embodiment of the present invention.
Figure 2:
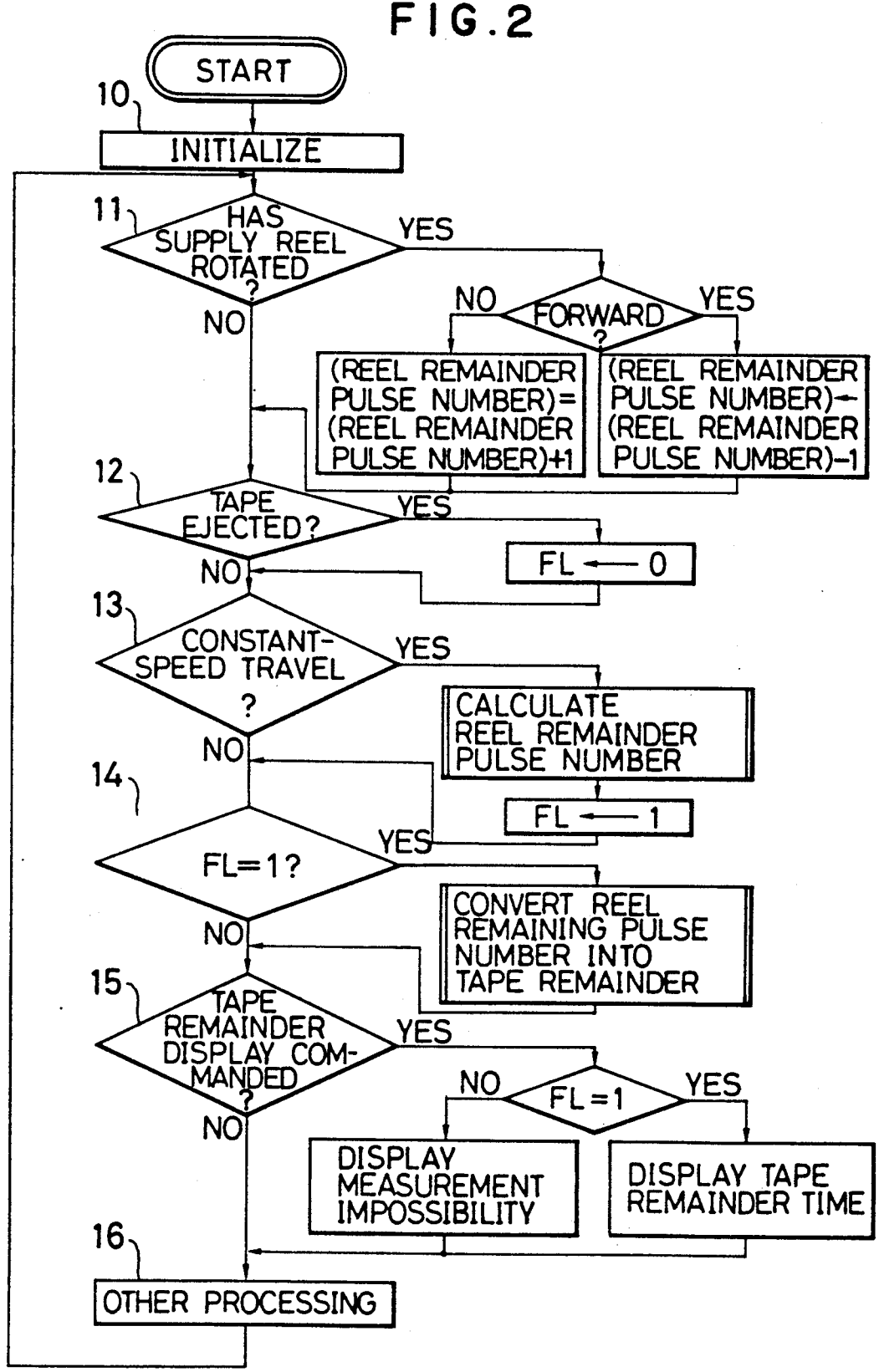
FIG. 2 is a flowchart for an embodiment of the present invention.

FIG. 1 is a block circuit diagram of an embodiment of the present invention. FIG. 2 is a flow diagram of the calculation performed by the CPU in an embodiment of the present invention.

In FIG. 1, a CPU 1, a display device 2 for displaying the tape remainder time or a similar device in response to the result of the calculation by the CPU 1, a supply reel 3, a hub 4, a magnetic tape 5, a rotation detection pulse generator 6 for outputting m pulse signals for one rotation of the reel 3, a take-up reel, 8 and a back-up power supply 9 for the RAM in the CPU 1 are illustrated.

If the radius of the hub 4 is r, the thickness of the tape 5 is d, and the radius of the reel 3 when the tape 5 is wound n turns on the reel is R, then:

$$R = nd + r. \quad (1)$$

If the speed of the tape 5 in a constant-speed travel is v, and the frequency of rotation of the reel 3 is fs, then:

$$2\pi R = v/fs. \quad (2)$$

From the equations (1) and (2), the number n for turns of the tape 5 is given by the following equation:

$$n = [V/(2\pi d)] \cdot fs - r/d. \quad (3)$$

The reel remainder pulse number P indicating the number of pulses corresponding to the tape remainder on the supply reel 3 is given by:

$$P = m \cdot n = [mv/(2\pi d)] \cdot fs - mr/d. \quad (4)$$

Because $\pi$, m, d, r and v (for the constant speed travel) are known constants, P can be determined from fs.

The length the (tape remainder length) L of the tape remainder on the reel 3 at this moment is given by:

$$\begin{aligned} L &= 2\pi(r+d) + 2\pi(r+2d) + \ldots + 2\pi(r+nd) \quad (5) \\ &= 2\pi \left( nr + \frac{n(n+1)}{2} d \right) \\ &= 2\pi nr + \pi dn(n+1) \\ &= \frac{2\pi r}{m} \cdot P + \frac{\pi d}{m^2} \cdot P(P+m) \left( \text{where } n = \frac{P}{m} \right). \end{aligned}$$

The tape remainder time T, which is a conversion in terms of the constant-speed travel time, is given by:

$$\begin{aligned} T &= \frac{L}{v} \quad (6) \\ &= \frac{2\pi r}{mv} \cdot P + \frac{\pi d}{v \cdot m^2} P(P+n) \\ &= \left( \frac{2\pi r}{mv} + m \right) P + \frac{\pi d}{vm^2} \cdot P^2. \end{aligned}$$

The operation of the CPU 1 will now be described.

The CPU 1 is supplied with a supply reel pulse signal 61. Additionally, the CPU 1 has either internal data or a reference clock supplied thereto for measuring the conditions of the tape, the travel conditions and the period. When a time display command is input, the CPU 1 performs the calculation of the equation (6), and displays the tape remainder time T on the display device 2. The display device 2 displays "tape remainder measurement impossible" when the constant-speed travel has never been made and the calculation of the reel remainder pulse number P has not been made. The CPU 1 includes an arithmetic unit, a memory, a RAM, and a ROM. The reel remainder pulse number P, the tape remainder time T, and a tape remainder flag (FL) are stored in the RAM. The reel remainder pulse number P and FL are backed up by the power supply 10. The constants that are required for the calculation, including the hub radius r, the tape thickness d, and the tape speed v are also stored therein.

The calculation performed by the CPU 1 will next be explained with reference to the flowchart of FIG. 2.

When the system is reset, the program is started, and an initialization of the calculation is performed. When the power supply back up has been off, FL is set to "0". The calculation then enters a loop, which includes the steps 11 to 16.

For instance, if FL=1 and the power is turned on in a back-up condition, and if the CPU 1 is in a stop condition, the steps 11 to 13 are all passed through since the determinations at these steps are all "NO". At the step 14, since FL=1, the reel remainder pulse number P is converted into the tape remainder time T. At the step 15, if FL=1 while the tape remainder time display command is supplied, the tape remainder time T is displayed on the display device 2.

If a rewinding process is then performed, each time the rotation of the reel 3 is detected at the step 11, the reel remainder pulse number P is counted up since the rotation is in the reverse direction. The steps 12 and 13 are passed through the reel remainder pulse number P that has been counted up is converted into the tape remainder time T at the step 14. Thus, when the rewinding process is performed, the reel remainder pulse number P is increased and the tape remainder time T that is a conversion from the reel remainder pulse number P is also increased.

If an eject (tape removal) operation is performed, FL is set to "0" at the step 12. When the tape remainder display command is input at the step 15, the display of "measurement impossible" is made on the display device 2 since FL="0".

When a tape is inserted thereafter as long as FL is set to "1" at the step 14, the measurement of the tape remainder time T remains impossible.

When the recording operation is thereafter performed, at the step 13, the reel remainder pulse number P is calculated from the period fs of rotation of the reel 3 at the step 13 using the equation (4), and FL is set to "1". After this, if the tape remainder time T is calculated by a conversion at the step 14 and the tape remainder display command is input at the step 15, the tape remainder display is performed.

After FL is set to "1", the reel remainder pulse number P is updated at the step 13 during the constant-speed travel. During the time other than constant-speed travel, the reel remainder pulse number P is counted up or down at the step 11 each time the reel 3 is rotated. Accordingly, the calculation and the display of the tape remainder time T is possible until the tape is again ejected, or until the power supply is turned off and the power supply back up is also turned off.

In the embodiment described, the rotation of the supply reel is detected and the tape remainder time T is displayed. However, of the period fr for the rotation of the take-up reel 8 may be arranged to be detected, and the reel travel pulse number Pr may be calculated from fr and the like. Thereby, the tape time Tr is calculated by a conversion of the reel travel pulse number Pr.

If the period of the rotation is detected for both of the supply reel 3 and the take-up reel 8, a display of the tape time with a higher accuracy can be achieved.

In the above description, d, r, v and the like are assumed to be known constants. Where several kinds of these constants are present and a discrimination is necessary, the discrimination can be made at the step 16 for "other processings".

The present invention can be applied to an apparatus, such as a digital tape recorder and a video tape recorder, in which magnetic tape contained in a cassette is used for recording and reproducing process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tape time display apparatus comprising:

outputting means for outputting a predetermined number of pulse signals for each rotation of a reel on which tape is wound;

detecting means for detecting a rotation period for said reel in response to the interval between said pulse signals when the tape travels at a constant speed;

first calculating means for calculating an initial reel pulse number, which corresponds to a total length of the tape wound on said reel, according to said rotation period for said reel, said constant speed of the tape travel, the thickness of the tape and the radius of said reel, in accordance with an equation, $$P = (mv/(2\pi d)) \cdot fs - mr/d;$$

where P=said initial reel pulse number, m=said predetermined number of pulse signals, d=the thickness of the tape, fs=said rotation period for said reel, r=the radius of said reel and v=said constant speed of the tape travel, counting means for determining an updated reel pulse number by adding or subtracting the number of pulse signals from said outputting means to or from said initial reel pulse number respectively;

second calculating means for calculating a tape time corresponding to the total length of the tape wound on said reel based on said updated reel pulse number when a tape time display command is input in accordance with an equation;

$$T = \left( \frac{2\pi r}{mv} + m \right) P + \frac{\pi d}{m^2 v} \cdot P^2,$$

and where P=said reel pulse number, m=said predetermined number of pulse signals, v=said constant speed of the tape travel r=the radius of said reel, d=the thickness of the tape and T=said tape time;

displaying means for displaying said tape time calculated by said second calculating means.

2. A tape time display apparatus as set forth in claim 1, wherein said reel is a supply reel, and said tape time is a time indicative of an amount of time for the tape remaining on said supply reel.

3. A tape time display apparatus as set forth in claim 1, wherein said reel is a take-up reel, and said tape time is a time indicative of an amount of time for the tape on said take-up reel.

4. A tape time display apparatus as set forth in claim 1, wherein a predetermined message indicating that said tape time is prevented from being calculated by said second calculating means is displayed on said displaying means when said tape time display command is input before said initial reel pulse number is calculated by said first calculating means.

5. A method for displaying a tape time comprising the steps of:

(a) outputting a predetermined number of pulse signals for each rotation of a reel on which tape is wound;

(b) detecting a rotation period for said reel in response to the interval between said pulse signals when the tape travels at a constant speed;

(c) calculating an initial reel pulse number, which corresponds to a total length of the tape wound on said reel, according to said rotation period for said reel, said constant speed of the tape travel, the thickness of the tape and the radius of said reel in accordance with an equation, $$P = (mv/(2\pi d)) fs - mr/d,$$

where P=said initial reel pulse number, m=said predetermined number of pulse signals, d=the thickness of the tape, fs=said rotation period for said reel, r=the radius of said reel and v=said constant speed of the tape travel;

(d) determining an updated reel pulse number by adding or subtracting the number of pulse signals outputted at said step (a) to or from said initial reel pulse number respectively;

(e) calculating a tape time corresponding to the total length of the tape wound on said reel based on said updated reel pulse number by converting said constant speed of the tape travel into the tape time when a tape time display command is input, in accordance with an equation, $$T = \left( \frac{2\pi r}{mv} + m \right) P + \frac{\pi d}{m^2 v} \cdot P^2,$$

where T=the tape time, P=said updated reel pulse number, m=said predetermined number of pulse signals and v=said constant speed of the tape travel; and (f) displaying the tape time calculated at said step (e).

6. A method as set forth in claim 5, wherein a predetermined message indicating that the tape time is prevented from being calculated at said step (e) is displayed at said step (f) when said tape time display command is input before said initial reel pulse number is calculated at said step (c).

* * * * *